United States Patent
Lee

(10) Patent No.: US 8,161,092 B2
(45) Date of Patent: *Apr. 17, 2012

(54) METHOD AND APPARATUS FOR EFFICIENT MATRIX MULTIPLICATION IN A DIRECT SEQUENCE CDMA SYSTEM

(75) Inventor: Yung-Hsiang Lee, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 1123 days.

This patent is subject to a terminal disclaimer.

(21) Appl. No.: 12/017,277

(22) Filed: Jan. 21, 2008

(65) Prior Publication Data

US 2008/0140752 A1 Jun. 12, 2008

Related U.S. Application Data

(63) Continuation of application No. 10/357,124, filed on Feb. 3, 2003, now Pat. No. 7,321,915.

(60) Provisional application No. 60/422,055, filed on Oct. 29, 2002.

(51) Int. Cl.
G06F 7/52 (2006.01)
H04B 7/216 (2006.01)
(52) U.S. Cl. ........................ 708/604; 370/342
(58) Field of Classification Search .............. 708/520, 708/607; 370/342
See application file for complete search history.

(56) References Cited

U.S. PATENT DOCUMENTS

| | | | |
|---|---|---|---|
| 4,777,614 A | 10/1988 | Ward | |
| 4,914,615 A | 4/1990 | Karmarkar et al. | |
| 6,895,421 B1 | 5/2005 | Dor et al. | |
| 7,321,915 B2 * | 1/2008 | Lee | 708/607 |
| 2005/0246611 A1 * | 11/2005 | Jin et al. | 714/754 |

OTHER PUBLICATIONS

Amira, A., et al., "Novel FPGA implementations of Walsh-Hadamard transforms for signal processing" IEE Proceedings: Vision, Image and Signal Processing, Institution of Electrical Engineers, GB, vol. 148, No. 6, Dec. 17, 2001, pp. 377-383.
European Search Report for EP Application No. 03023971.9.

* cited by examiner

*Primary Examiner* — Chuong D Ngo
(74) *Attorney, Agent, or Firm* — Thomas, Kayden, Horstemeyer & Risley, LLP

(57) ABSTRACT

System and method for processing symbols in a communication system are disclosed and may include in a processor that receives symbols to be coded for transmission over a wireless medium, grouping elements of an input matrix across a second dimension of the input matrix to form groups of matrix elements while multiplying the input matrix and an input vector. The input vector may include the symbols to be coded for transmission over the wireless medium. The method may also include pre-computing possible permutations of partial results for each of the groups of matrix elements, and assigning the partial results from each of the groups of matrix elements to each of a corresponding index of a first dimension of the input matrix to form a matrix of assigned partial results.

32 Claims, 6 Drawing Sheets

Receive Side $[C_1 \ldots C_{128}] \times \begin{bmatrix} & & \\ & M^{-1} & \\ & (128 \times 128) & \end{bmatrix} = [S_1 \ldots S_{128}]$ (1 x 128)     (1 x 128)

$= C_1 \pm C_2 \pm C_3 \pm \ldots \pm C_{128}$
(if elements of $M^{-1}$ are ±1)

$S_{j=1} = \sum_{i=1}^{i=128} C_i M^{-1}_{i,j=1}$ $\bullet \bullet \bullet$ $S_{j=128} = \sum_{i=1}^{i=128} C_i M^{-1}_{i,j=128}$ → receive $[S_1 \ldots S_{128}]$

FIG. 4

Generate any one of the P1 to P16 partial results simply by adding or subtracting one of the corresponding critical 8

METHOD AND APPARATUS FOR EFFICIENT MATRIX MULTIPLICATION IN A DIRECT SEQUENCE CDMA SYSTEM

CROSS-REFERENCE TO RELATED APPLICATIONS/INCORPORATION BY REFERENCE

This application is a continuation of U.S. patent application Ser. No. 10/357,124 filed Feb. 3, 2003 (now U.S. Pat. No. 7,321,915), which also makes reference to, claims priority to and claims the benefit of United States provisional patent application serial number 60/422,055 filed on Oct. 29, 2002.

BACKGROUND OF THE INVENTION

Embodiments of the present invention relate generally to a system and method for performing matrix multiplication, and more particularly to multiplying a vector by a matrix in a direct-sequence CDMA system.

A direct-sequence CDMA system is one form of a spread spectrum system for transmitting and receiving information. In a spread spectrum system, a transmitted signal is effectively spread over a wide band of frequencies. The wide band of frequencies is typically much wider than a minimum bandwidth of frequencies needed to transmit the information. The advantages of spreading a signal to be transmitted over a wide band of frequencies include interference rejection, secure communications, and code division multiplexing (using code sequences as information channels within a common radio channel, i.e. CDMA). CDMA allows the same band of frequencies to be shared with many users.

The direct-sequence method is a well-known and widely used spread spectrum technique that is easily implemented. In the direct-sequence method, a relatively narrow band transmit signal is modulated by a code sequence to create a wide band signal. Typically, the code sequence comprises a pseudo-random code having a fixed length. The rate of the code sequence is the chip rate where a chip corresponds to an element in the code sequence. The amount of spreading achieved is determined by the number of chips per transmit symbol in the original transmit signal.

When a transmitted spread spectrum signal is received, the signal must be de-spread to recover the original information. The method of de-spreading a signal is classified as a correlation process. De-spreading is typically accomplished by multiplying the spread spectrum signal with a copy of the code upon reception. As a result, the original transmitted signal may be recovered.

Different receivers may be accessed or addressed separately by designating a different code to each receiver. Codes may also be selected that have low cross correlation properties to reduce the potential for interference between receivers.

Often, the signals to be transmitted are digital signals that are represented as vectors of information symbols. Each symbol in a vector may correspond to a different information channel to be transmitted. A vector of information symbols may be coded or spread by multiplying the vector by a matrix of direct-sequence codes (one code per symbol in the vector) to form a spread spectrum vector to be transmitted.

Upon reception, the spread spectrum vector is de-spread by multiplying the spread spectrum vector by the inverse of the matrix of direct-sequence codes, therefore recovering the original vector of information symbols.

The matrix multiplication operations, if performed by brute force, require many multiplication and addition/subtraction operations, especially if the matrix of direct-sequence codes is of any significant size such as, for example, 128 elements by 128 elements. Matrix multiplication is often performed by, at least in part, a number of accumulators that accumulate the multiplied results for each code as the chip data becomes available. Assuming there are N different codes and Q chips per spread symbol in total, then a brute force implementation requires N×Q additions/subtractions for both spreading and de-spreading. Each operation translates into additional cost, hardware, and power consumption in the CDMA system.

It is desirable to greatly reduce the number of operations that are performed during the matrix multiplication process of the spreading and de-spreading functions in order to reduce cost, hardware, and power consumption in a direct-sequence CDMA system.

Further limitations and disadvantages of conventional and traditional approaches will become apparent to one of skill in the art, through comparison of such systems with embodiments of the present invention as set forth in the remainder of the present application with reference to the drawings.

BRIEF SUMMARY OF THE INVENTION

Certain embodiments of the present invention provide a system and method for performing efficient matrix multiplication in a direct-sequence CDMA system to facilitate the spreading and de-spreading of a sequence of information symbols.

A method of the present invention provides for efficiently performing multiplication of an input vector and an input matrix having a limited number of possible values for any element of the input matrix. Elements of the input matrix are grouped across a second dimension of the input matrix to form groups of matrix elements. All possible permutations of partial results for each of the groups of matrix elements are pre-computed. The partial results from each of the groups of matrix elements are assigned to each of a corresponding index of a first dimension of the input matrix to form a matrix of assigned partial results. The assigned partial results are summed along the first dimension of the matrix of assigned partial results to form a vector of full matrix multiplication results.

Apparatus of the present invention provides, in a direct-sequence CDMA system, a pre-computation module to generate a matrix of partial results from an input matrix and an input vector by, in part, grouping elements of the input matrix across a second dimension of said input matrix. A post-computation module is also provided to sum along a first dimension of the matrix of partial results in a time-shared manner to form a vector of full matrix multiplication results as partial results in the matrix of partial results become available from the pre-computation module. The pre-computation module and post-computation module share a time-shared accumulator module to accumulate results.

Certain embodiments of the present invention afford an approach for efficiently multiplying a vector of uncoded or coded symbols by a matrix of direct-sequence codes or an inverse matrix of direct-sequence codes in a CDMA system where the elements of the matrix and inverse matrix comprise a limited number of possible values.

These and other advantages and novel features of the present invention, as well as details of an illustrated embodiment thereof, will be more fully understood from the following description and drawings.

BRIEF DESCRIPTION OF THE DRAWINGS

FIG. 4 is an exemplary illustration of a mathematical approach for multiplying a vector of coded symbols by an inverse matrix of direct-sequence codes in a receiver of a CDMA system in accordance with an embodiment of the present invention.

FIG. 6 is an exemplary illustration of sixteen partial results P1 to P16 generated using the grouping of FIG. 5 in accordance with an embodiment of the present invention.

DETAILED DESCRIPTION OF THE INVENTION

Figure 1:
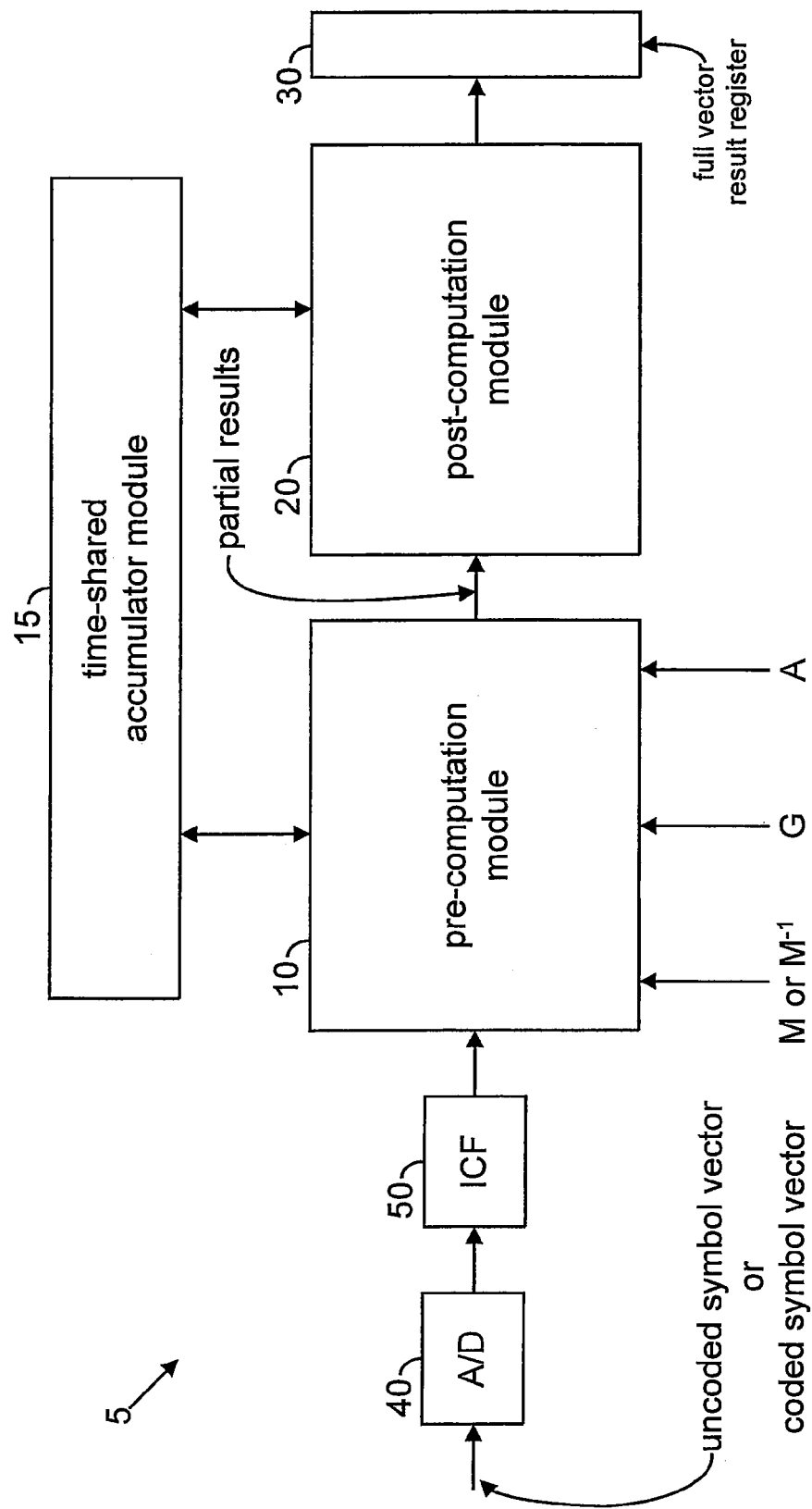
FIG. 1 is a schematic block diagram of an apparatus for performing efficient multiplication of a vector by a matrix in a direct-sequence CDMA system in accordance with an embodiment of the present invention.

FIG. 1 is a schematic block diagram of an architecture 5 for performing efficient multiplication of a vector by a matrix in a direct-sequence CDMA system in accordance with an embodiment of the present invention. The architecture 5 supports both spreading and de-spreading functions. The architecture 5 comprises a pre-computation module 10, a time-shared accumulator module 15, a post-computation module 20 and a full vector result register 30 in accordance with an embodiment of the present invention. The architecture 5 further comprises an analog-to-digital converter 40 and an ingress/channel cancellation filter 50.

In an embodiment of the present invention, uncoded analog symbols (or coded analog symbols) are input to an A/D converter 40, are digitized, and configured as an input vector. As an option, the vector of digital symbols may be filtered by ICF filter 50. The vector of digital symbols are fed into pre-computation module 10 along with a matrix of direct-sequence codes, M (or an inverse matrix of direct-sequence codes, $M^{-1}$), a grouping number G, and a number of adds/subtracts A used to perform pre-computation.

Figure 2:
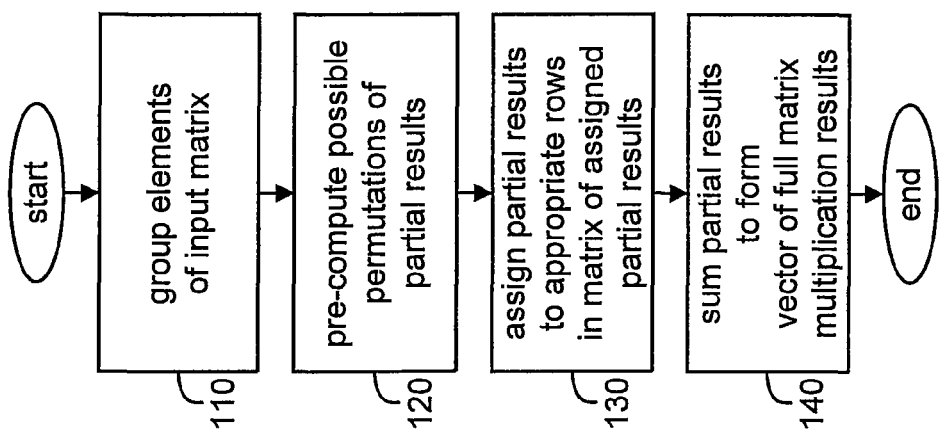
FIG. 2 is a flowchart of a method for performing efficient multiplication of a vector by a matrix using the direct-sequence CDMA system of FIG. 1 in accordance with an embodiment of the present invention.

Referring to the method of FIG. 2, in an embodiment of the present invention, the pre-computation module 10 groups columns of the matrix M (or inverse matrix $M^{-1}$) according to the grouping number G in step 110. In step 120, all possible permutations of partial results for each grouping are pre-computed by pre-computation module 10 using time-shared accumulator module 15, performing only the number of adds/subtracts specified by A. In step 130, the partial results for each grouping are assigned to (correlated to) the appropriate rows of the matrix M (or inverse matrix $M^{-1}$) to form a matrix of assigned partial results. In step 140, columns of the matrix of assigned partial results are summed by post-computation module 20 using time-shared accumulator module 15 to form a vector of full matrix multiplication results that is stored in full vector register 30.

Figure 3:
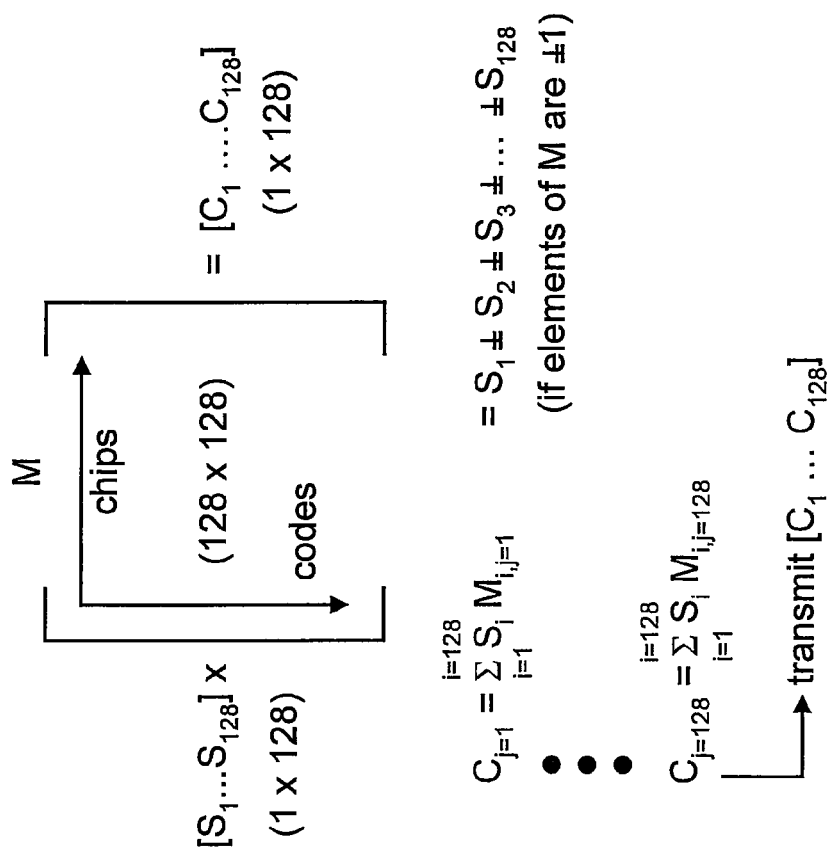
FIG. 3 is an exemplary illustration of a mathematical approach for multiplying a vector of uncoded symbols by a matrix of direct-sequence codes in a transmitter of a CDMA system in accordance with an embodiment of the present invention.

The details of one embodiment of a method are now discussed. In an embodiment of the present invention, the matrix of direct-sequence codes, M (or inverse matrix of direct-sequence codes, $M^{-1}$) comprises elements having values of only +1 or −1. Referring to FIG. 3, an input vector of 128 uncoded symbols $[S_1 \ldots S_{128}]$, to be transmitted by a CDMA transmitter, is input to pre-computation module 10. The input vector $[S_1 \ldots S_{128}]$ is to be effectively multiplied by matrix M which is a 128×128 element matrix comprising 128 direct-sequence codes of 128 chips each (i.e. each row in matrix M comprises a direct-sequence code of 128 chips or elements) in accordance with an embodiment of the present invention.

As may be seen in FIG. 3, when the vector $[S_1 \ldots S_{128}]$ is multiplied by the matrix M, the result is a vector of coded symbols $[C_1 \ldots C_{128}]$. The coded symbols encompass a much larger signal bandwidth than the original uncoded symbols $[S_1 \ldots S_{128}]$. The coded symbols $[C_1 \ldots C_{128}]$ may be transmitted to a CDMA receiver at a remote location.

A brute force computation of the matrix multiplication of $[S_1 \ldots S_{128}]$ by M would require 128×128=16,384 multiplies and 128×128=16,384 adds/subtracts for a total of 32,768 operations. However, since the matrix M comprises elements of only +1 or −1 in accordance with an embodiment of the present invention, the number of operations may be greatly reduced. As a result, the result of any coded symbol $C_j$ comprises only the addition or subtraction of the original uncoded symbols $[S_1 \ldots S_{128}]$ as may be seen in FIG. 3. Each $C_j$ comprises a unique combination of additions and subtractions according to the direct-sequence code in each row of matrix M.

Similarly, upon reception of the vector of coded symbols $[C_1 \ldots C_{128}]$, de-spreading may be accomplished by multiplying the vector of coded symbols $[C_1 \ldots C_{128}]$ by the inverse matrix $M^{-1}$ to recover the original vector of uncoded symbols $[S_1 \ldots S_{128}]$ as shown in FIG. 4. Since M is a matrix of +1's and −1's $M^{-1}$ is also a 128×128 matrix comprising +1's and −1's. Therefore, each $S_j$ comprises a unique combination of additions and subtractions of the coded symbols $[C_1 \ldots C_{128}]$ according to each row of matrix $M^{-1}$.

The method of FIG. 2 and the architecture of FIG. 1 allow the number of additions/subtractions to be greatly reduced according to an embodiment of the present invention. Specifically, referring to FIG. 5, assume the number of groupings, G, to be made in step 110 by pre-computation module 10 is four. Every four elements across rows of $M^{-1}$ are grouped together. Based on the grouping of four, there are only $2^4=16$ possible permutations of results for each grouping. For each grouping, only a total of 12 adds/subtracts are performed.

Figure 5:
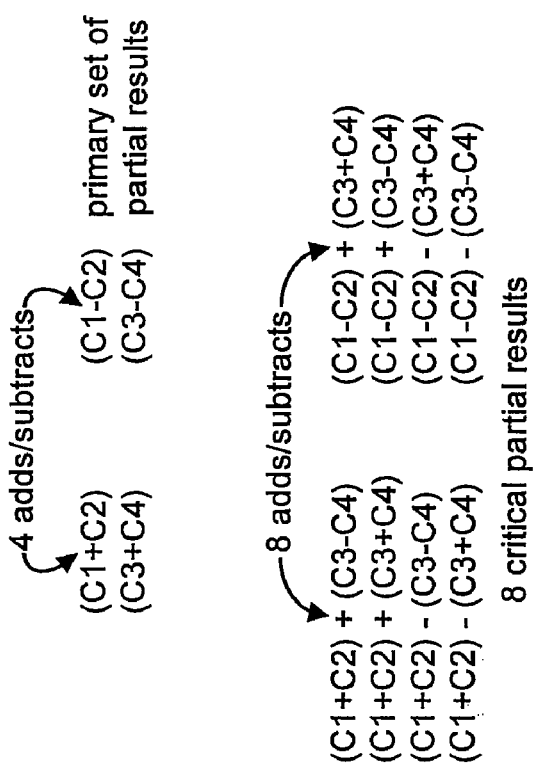
FIG. 5 is an exemplary illustration of grouping elements of a matrix to generate partial matrix multiplication results using a reduced number of adds/subtracts in accordance with an embodiment of the present invention.

FIG. 5 shows a grouping of four upon reception of the coded symbols $[C_1 \ldots C_{128}]$. The first grouping of four comprises $[C_1 \ldots C_4]$, the second grouping comprises $[C_5 \ldots C_9]$, and so on across the entire inverse matrix $M^{-1}$. For the first grouping $[C_1 \ldots C_4]$, for example, sixteen combinations of $[C_1 \ldots C_4]$ are generated and then assigned (correlated) to the various rows of the inverse matrix $M^{-1}$, according to the 1's and −1's of each row, to form a first column of a matrix of partial results. The sixteen combinations (partial results P1 to P16) are assigned down all 128 rows of inverse matrix $M^{-1}$ and, therefore, are not unique to a row. In one embodiment, the redundancy due to the grouping is what reduces the number of required operations.

FIG. 5 illustrates that 12 adds/subtracts are used to generate the permutations of $[C_1 \ldots C_4]$. First, 4 adds/subtracts are performed by pre-computation module 10 to generate a primary set of partial results. Then 8 more adds/subtracts are performed by pre-computation module 10 on the primary set of partial results to generate a set of 8 critical partial results.

FIG. 6 illustrates that, to obtain the sixteen partial results P1 to P16, from the 8 critical partial results, the sign of the 8 critical partial results is simply changed to obtain the other 8 permutations. Therefore, for any grouping of G=4, only A=12 adds/subtracts are performed during pre-computation. Again, the grouping and pre-computation of partial results is done across the entire inverse matrix $M^{-1}$ to effectively form a matrix of partial results. When the columns of the matrix of partial results are summed by post-computation module 20, the result is the original unspread vector $[S_1 \ldots S_{128}]$ which is stored in full vector result register 30.

If the grouping was not performed but, instead, the brute force method of performing every add/subtract in every row was used, the required number of adds/subtracts for the first 4 columns of the inverse matrix $M^{-1}$ would be much larger than 12.

In an embodiment of the present invention, the pre-computation module 10 processes the chips or columns of the inverse matrix $M^{-1}$ in a pipelined manner (i.e. each column or chip of the inverse matrix $M^{-1}$ is clocked through in succession). By waiting for the system to clock through, for example, 4 chips, the structure of the matrix and redundancy in the data may be taken advantage of to reduce the number of operations to be performed.

As a result, there are 12 adds/subtracts (pre-computations) per 4-chip time interval (grouping of 4 columns) plus an additional 128 adds per 4-chip time interval to sum down the resulting column of the matrix of partial results for the first 4 columns of the inverse matrix $M^{-1}$. This equates to 140 adds/subtracts per 4-chip time interval or 35 adds/subtracts per 1-chip time interval.

The brute force method of computing the results requires 128 adds/subtracts per 1-chip time interval. Therefore, instead of requiring 128 accumulators to perform 128 add/subtracts every 1-chip time interval, 35 accumulators may be used to perform 35 add/subtracts every 1-chip time interval in accordance with an embodiment of the present invention. The reduced number of 35 accumulators may be time-shared such that all computations are performed in the same amount of time as the brute force method of using 128 accumulators. The factor of savings in power and accumulator hardware is 128/35=3.657 (almost a factor of 4 savings).

In an embodiment of the present invention, time-shared accumulator module 15 comprises the 35 accumulators that are shared between pre-computation module 10 and post-computation module 20.

In other embodiments of the present invention, other groupings may be accomplished. The general formula for the factor of savings in power and accumulators for a 128×128 matrix M (or inverse matrix $M^{-1}$) is:

$$128/[A/G + \text{ceiling}(128/G)] \qquad \text{eqn. 1}$$

where G is the number of chips that are grouped together, A is the number of adds/subtracts required for pre-computation, and ceiling is the round-up function.

The following table shows A for various groupings G.

| G | A |
|---|---|
| 2 | 2 |
| 3 | 6 |
| 4 | 12 |
| 5 | 24 |
| 6 | 44 |
| 7 | 82 |
| 8 | 152 |

As may be seen, A is an exponential function of G because the number of permutations grows exponentially. As a result of the exponential growth, the linear factor of reduction by G is soon overcome by the growth of A. For the particular example of N=128 codes and Q=128 chips per code, the optimal G is 6 and yields a factor of 4.34 reduction in accumulators (adders) and power.

Also, it generally does not make sense to perform pre-computations beyond the inherent redundancy offered within the grouping window for 128 unique codes. For example, in a grouping window of 8, there are potentially $2^8=256$ possible results already, while there are only N=128 unique codes.

Even though the number of accumulators (adders) is reduced by grouping, pipeline registers are also used in the grouping process. Memory storage for $2^{(G-1)}$ permutations of possible results are typically used. Therefore, for G=4, 35 accumulators (adders) are time-shared per 1-chip time interval, however, $2^3=8$ pipeline registers are typically used as well. As G increases, the number of pipeline registers increases and, therefore, the impact of using larger G should be carefully evaluated.

Other embodiments of the present invention are not limited to M or $M^{-1}$ having element values of +1 and −1. For example, an alternative embodiment of the present invention may limit element values to +2, +1, −1, and −2. Also, other embodiments of the present invention are not limited to vectors of length 128 or M or M−1 of dimensions 128×128. Other N-length vectors and N×Q matrices may be implemented in various embodiments of the present invention.

The various elements of the system and method may be combined or separated according to various embodiments of the present invention. For example, pre-computation module 10 and post-computation module 20 may be combined into a single processing module in accordance with an embodiment of the present invention.

In summary, certain embodiments of the present invention afford an approach to achieve significant reductions in power consumption, cost, and hardware by processing groups of chips in a direct-sequence CDMA system. For N unique codes and Q chips per code, the larger N is, and the smaller the set of base elements of matrix M, the better are the gains in efficiency. Q does not have much effect on the grouping process except that Q affects the rounding in the ceiling function.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for processing symbols in a communication system, the method comprising:
    grouping elements in each column of an input matrix to form a matrix of indices, each index corresponding to a particular group of matrix elements;
    pre-computing possible permutations of partial results, each partial result is the product of a particular group of matrix elements corresponding to an index and a subset of elements of an input vector, wherein the input vector comprises symbols;
    assigning the partial results from each particular group of matrix elements to each of a corresponding index in the matrix of indices to form a matrix of assigned partial results; and
    summing the assigned partial results along each column of the matrix of assigned partial results to form a vector of full matrix multiplication results comprising coded information for transmission to one or more receivers via a wireless medium.

2. The method of claim 1, wherein the pre-computing comprises performing one or more of addition, subtraction, and multiplication.

3. The method of claim 1, wherein the matrix of assigned partial results is generated over time as corresponding elements of the input matrix are pipeline-processed to generate the partial results.

4. The method of claim 1, wherein the summing is performed in a time-shared manner as assigned partial results become available for summing.

5. The method of claim 1, wherein each element of the input matrix comprises a value of +1 or −1.

6. The method of claim 1, wherein each element of the input vector comprises an uncoded symbol in a direct-sequence CDMA transmitter.

7. The method of claim 1, wherein each element of the input vector comprises a coded symbol in a direct-sequence CDMA receiver.

8. The method of claim 1, wherein each index of the input matrix corresponds to a direct-sequence code of the input matrix.

9. The method of claim 1, wherein the input matrix comprises an inverse of a matrix of direct-sequence codes.

10. The method of claim 1, wherein the grouping comprises performing an optimal grouping based on tradeoffs between performance, power, cost, and hardware for the system.

11. A system for processing symbols for wireless communication, the system comprising:
one or more circuits operable to:
receive symbols to be coded for transmission over a wireless medium,
group elements in each column of an input matrix to form a matrix of indices, each index corresponding to a particular group of matrix elements;
pre-compute possible permutations of partial results each partial result is the product of a particular group of matrix elements corresponding to an index and a subset of elements of an input vector, wherein the input vector comprises symbols;
assign the partial results from each particular group of matrix elements to each of a corresponding index in the matrix of indices to form a matrix of assigned partial results; and
sum the assigned partial results along each column of the matrix of assigned partial results to form a vector of full matrix multiplication results comprising coded information for transmission to one or more receivers via a wireless medium.

12. The system of claim 11, wherein the one or more circuits are operable to perform one or more of addition, subtraction, and multiplication.

13. The system of claim 11, wherein the one or more circuits are operable to generate the matrix of assigned partial results over time as corresponding elements of the input matrix are pipeline-processed to generate the partial results.

14. The system of claim 11, wherein the one or more circuits are operable to execute the summing in a time-shared manner as assigned partial results become available for summing.

15. The system of claim 11, wherein each element of the input matrix comprises a value of +1 or −1.

16. The system of claim 11, wherein each element of the input vector comprises an uncoded symbol in a direct-sequence CDMA transmitter.

17. The system of claim 11, wherein each element of the input vector comprises a coded symbol in a direct-sequence CDMA receiver.

18. The system of claim 11, wherein each index of the input matrix corresponds to a direct-sequence code of the input matrix.

19. The system of claim 11, wherein the input matrix comprises an inverse of a matrix of direct-sequence codes.

20. The system of claim 11, wherein the grouping is based on tradeoffs between performance, power, cost, and hardware for the system.

21. The system of claim 11, wherein the one or more circuits comprises a pre-computing module, a post-computing module, a cancellation filter, an analog to digital converter, and an accumulator module.

22. The system of claim 21, wherein the accumulator module is a time shared module.

23. A machine-readable storage having stored thereon, a non-transitory computer program having at least one code section for processing symbols in a communication system, the at least one code section being executable by a machine for causing the machine to perform steps comprising:
grouping elements in each column of an input matrix to form a matrix of indices, each index corresponding to a particular group of matrix elements;
pre-computing possible permutations of partial results, each partial result is the product of a particular group of matrix elements corresponding to an index and a subset of elements of an input vector, wherein the input vector comprises symbols;
assigning the partial results from each particular group of matrix elements to each of a corresponding index in the matrix of indices to form a matrix of assigned partial results; and
summing the assigned partial results along each column of the matrix of assigned partial results to form a vector of full matrix multiplication results comprising coded information for transmission to one or more receivers via a wireless medium.

24. The machine-readable storage of claim 23, wherein the pre-computing comprises performing one or more of addition, subtraction, and multiplication.

25. The machine-readable storage of claim 23, wherein the matrix of assigned partial results is generated over time as corresponding elements of the input matrix are pipeline-processed to generate the partial results.

26. The machine-readable storage of claim 23, wherein the summing is performed in a time-shared manner as assigned partial results become available for summing.

27. The machine-readable storage of claim 23, wherein each element of the input matrix comprises a value of +1 or −1.

28. The machine-readable storage of claim 23, wherein each element of the input vector comprises an uncoded symbol in a direct-sequence CDMA transmitter.

29. The machine-readable storage of claim 23, wherein each element of the input vector comprises a coded symbol in a direct-sequence CDMA receiver.

30. The machine-readable storage of claim 23, wherein each index of the input matrix corresponds to a direct-sequence code of the input matrix.

31. The machine-readable storage of claim 23, wherein the input matrix comprises an inverse of a matrix of direct-sequence codes.

32. The machine-readable storage of claim 23, wherein the grouping comprises performing an optimal grouping based on tradeoffs between performance, power, cost, and hardware for the system.

* * * * *